(12) United States Patent
Wedde

(10) Patent No.: US 6,406,524 B1
(45) Date of Patent: Jun. 18, 2002

(54) PLANT FOR REMOVING FLUOR CONTAINING WASTE GASES

(75) Inventor: Geir Wedde, Oslo (NO)

(73) Assignee: ABB Flakt AB, Stockholm (SE)

( * ) Notice: Subject to any disclaimer, the term of this patent is extended or adjusted under 35 U.S.C. 154(b) by 0 days.

(21) Appl. No.: 09/446,838

(22) PCT Filed: Jun. 5, 1998

(86) PCT No.: PCT/NO98/00171
§ 371 (c)(1),
(2), (4) Date: Feb. 24, 2000

(87) PCT Pub. No.: WO98/59094
PCT Pub. Date: Dec. 30, 1998

(30) Foreign Application Priority Data

Jun. 25, 1997 (NO) ............................................. 972973

(51) Int. Cl.[7] ............................................. B01D 53/06
(52) U.S. Cl. ............................. 96/150; 95/108; 95/131
(58) Field of Search ......................... 55/385.1, 467; 204/244, 245; 205/393; 95/108, 131; 96/150

(56) References Cited

U.S. PATENT DOCUMENTS 3,616,439 A * 10/1971 Love ........................... 204/245
3,664,935 A * 5/1972 Johnson ....................... 204/245
3,780,497 A   12/1973 Muhlrad
4,065,271 A * 12/1977 Weckesser et al. ............ 95/131
4,501,599 A *  2/1985 Loukos ......................... 95/131

FOREIGN PATENT DOCUMENTS

| GB | 1416344 | 12/1975 |
| WO | 9615846 | 5/1996 |
| WO | 9746473 | 12/1997 |

* cited by examiner

Primary Examiner—Robert A. Hopkins
(74) Attorney, Agent, or Firm—Kenyon & Kenyon

(57) ABSTRACT

A decentralized cleaning plant for dry cleaning by removing fluorine containing waste gases from a reduction process in several electrolytic cells for aluminum, comprising: a storing place for aluminum oxide; a transportation system to distribute aluminum oxide from the storing place to the decentralized cleaning plant, a filter portion to store aluminum oxide before and after use in the decentralized cleaning plant; and an exhaust fan integrated with a top filter part of the plant, wherein a chimney and a separate silo are not required.

4 Claims, 1 Drawing Sheet

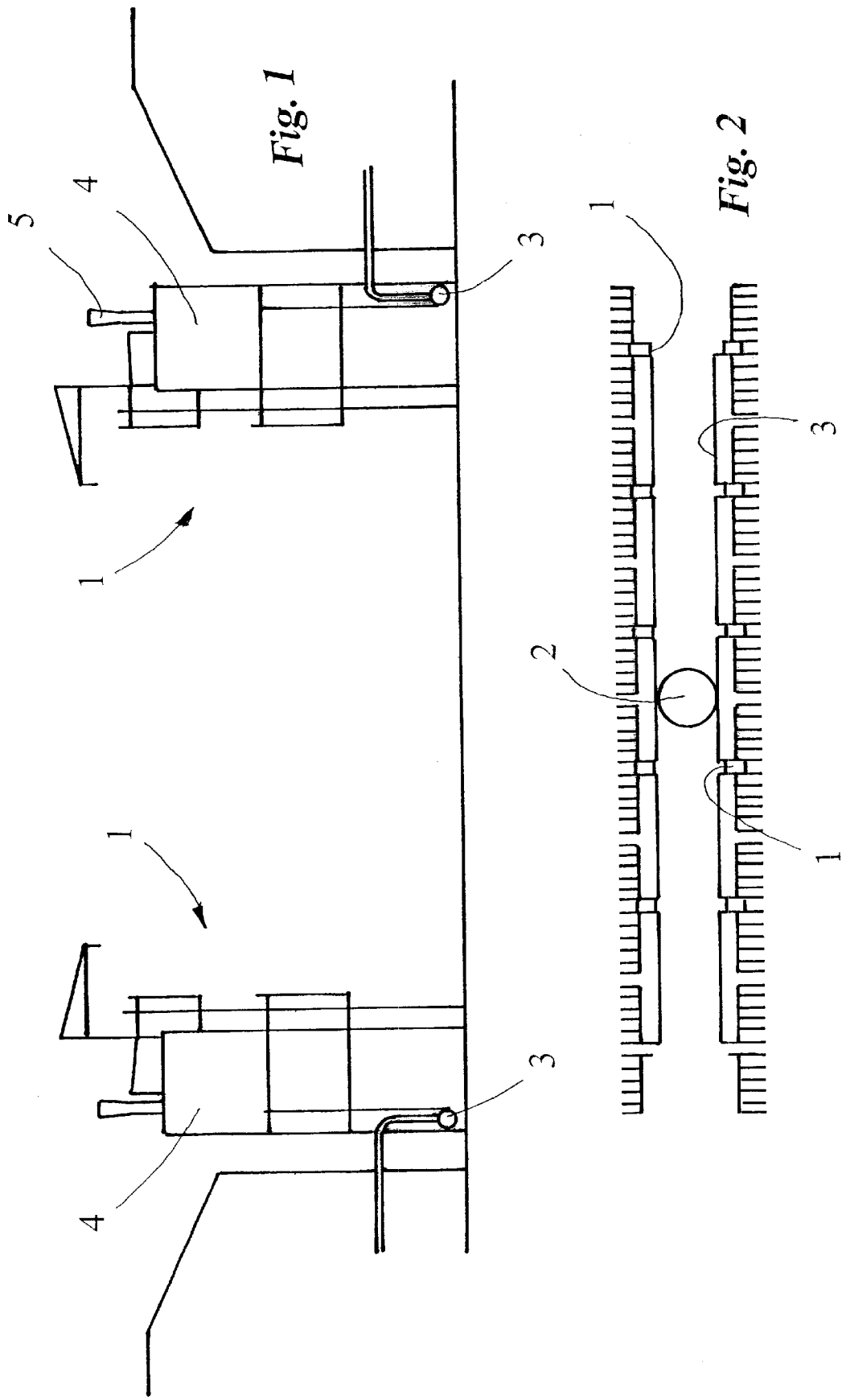

PLANT FOR REMOVING FLUOR CONTAINING WASTE GASES

The present invention is related to a plant for decentralized dry cleaning by removing fluorine containing waste gases from the reduction process in electrolytic cells for aluminum.

Known embodiments of plants for dry cleaning of waste gases developed during electrolytic processing of aluminum, are centralized plants servicing one or several halls comprising ovens with cells whereby each hall may comprise between 70 and 150 electrolytic cells or ovens, and which are arranged centrally between the halls or outside. The plant is connected with each of the cells by means of a comprehensive and costly effluent channel. The aluminum oxide used as adsorbent during the cleaning process is stored in separate silos before or after use in the cleaning process and thereafter is transported back to each cell by means of transportation vehicles, cranes or other transportation systems for aluminum, such as a system for transportation in a compact phase.

With the device according to the present invention for cleaning of waste gases from the reduction process of aluminum, substantial savings are achieved as to the volume or area needed, as well as savings in the equipment and time savings during the process and the building. This is achieved with the plant according to the present invention as described with the features stated in the claims.

By using a decentralized plant according to the present invention major parts of the traditional stores and transportation systems for aluminum oxide as can be found in known plants for dry cleaning, are eliminated.

With the present invention a substantial reduction on the space requirement is achieved, furthermore the processing time is reduced and a much more simpler construction and operation is achieved. There is no demand for a storing silo for treated aluminum oxide and likewise the demands for fundamentations are substantially reduced. As opposed to known embodiments of plants, no chimney is required furthermore no silos and no lifting devices. Furthermore large flexibility is achieved as to starting up the operation and there is a short distance between the places for storing of the aluminum oxide and the ovens. The method of storing and the place of storing for the aluminum oxide may be chosen depending on local conditions and suitability. With the present invention suitable groups of between 5 and 40 electrolytic cells may be served in each pant, preferably between 10 and 20.

The present invention provides further substantial reduced energy consumption and thereby achieves substantial cost savings. As a result of the simplified plant, the need for spare parts also is substantially reduced. Outlet dampers for the filters are not necessary and there also is no need for a compressor room as the case is with known plants. The installation time is strongly reduced and the design well adapted for adjustment to specific products.

The drawing discloses schematically a plant according to the present invention where FIG. 1 discloses a section 2—2 in FIG. 2 and FIG. 2 discloses a ground view of a plant according to the invention.

Fresh aluminum oxide is transported in a compact form from a central tank 2 to each decentralized cleaning plant 1 by a transportation system, such as a piping system 3. Further storing of aluminum oxide before or after use in the plant 1 is made in storing tanks integrated in the filter portion 4 of the cleaning plant. The waste gas fan 5 which is serving each cleaning plant 1, is integrated with the top filter part and makes the traditional outlet dampers on top of the filter redundant.

The new embodiment enables recirculation of fluorides and other raw materials from a specific group of cells, in return to the same cells.

The modules for removing impurities as well as $SO_2$ also can be integrated in a very simple way as part of the decentralized plant 1 for dry cleaning, possibly at a later time.

What is claimed is:

1. A plant for dry cleaning by removing fluorine containing waste gases from a reduction process in several electrolytic cells for aluminum, comprising: a central storing place for aluminum oxide from which a piping system distributes the aluminum oxide from the central storing place to a plurality of decentralized cleaning plants, each decentralized cleaning plant comprising a storage portion to store aluminum oxide before and after use in the decentralized cleaning plant, in flow communication with a filter portion, the filter portion using aluminum oxide to remove fluorine containing waste gases from a waste gas flow; and an exhaust fan integrated with a top part of the filter portion of each decentralized cleaning plant, wherein a separate silo is not employed, and each decentralized cleaning plant is adapted to serve groups of between 5 and 40 electrolytic cells.

2. The decentralized cleaning plant according to claim 1 wherein the plant is adapted to serve groups of between 10 and 20 electrolytic cells.

3. The decentralized cleaning plant according to claim 1 wherein the storing place is a central tank.

4. A plant for dry cleaning by removing fluorine containing waste gases from a reduction process in several electrolytic cells for aluminum, consisting essentially of:

a central storing place for aluminum oxide from which a piping system distributes the aluminum oxide from the storing place to a plurality of decentralized cleaning plants, each decentralized cleaning plant comprising a storage portion to store aluminum oxide before and after use in the decentralized cleaning plant, in flow communication with a filter portion, the filter portion using aluminum oxide to remove fluorine containing waste gases from a waste gas flow; and an exhaust fan integrated with a top part of the filter portion of each decentralized cleaning plant; wherein a separate silo is not employed, and each decentralized cleaning plant is adapted to serve groups of between 5 and 40 electrolytic cells.

* * * * *